United States Patent Office 3,629,156

Patented Dec. 21, 1971

3,629,156

ELECTRICAL RESISTORS COMPRISING RHOMBOHEDRAL PLATINUM COBALT OXIDES

Robert D. Shannon, Wilmington, Del., assignor to E. I. du Pont de Nemours and Company, Wilmington, Del.

No Drawing. Application Aug. 16, 1968, Ser. No. 753,065, now Patent No. 3,514,414, which is a continuation-in-part of applications Ser. No. 561,336, and Ser. No. 612,775, both Jan. 31, 1967. Divided and this application Nov. 12, 1969, Ser. No. 876,031

Int. Cl. H01b *1/06*

U.S. Cl. 252—518 9 Claims

ABSTRACT OF THE DISCLOSURE

Electrical resistors can be made by applying to a ceramic dielectric substrate, and firing, a composition of a rhombohedral platinum cobalt oxide having the space group $R\bar{3}m$. Usually, the oxide has the formula $Pt_xCo_yO_2$, in which each of $x$ and $y$ is about $0.85\pm0.15$, but it also can contain about 0.1–2.0% by weight of manganese in its crystal lattice. In the latter case, the oxide has the formula $Pt_xMn_zCo_yO_2$, in which $x$ and $y$ are as above, and $z$ is a value from 0.004 to 0.11.

RELATED APPLICATIONS

This is a division of application Ser. No. 753,065, filed Aug. 16, 1968, now Pat. No. 3,514,414, which was a continuation-in-part of applications Ser. No. 561,336, filed June 29, 1966, and Ser. No. 612,775, filed Jan. 31, 1967, both now abandoned.

BACKGROUND OF THE INVENTION

This invention relates to new platinum cobalt oxide compositions suitable for making electrical resistors and to electrical resistors made therewith.

Electrically conductive rhombohedral platinum cobalt oxides are disclosed in the parent application Ser. No. 753,065. Platinum cobalt oxide can be represented by the formula $$Pt_xCo_yO_2$$

wherein each of $x$ and $y$ can have a value of about $0.85\pm0.15$. Platinum cobalt oxide can optionally contain in its crystal lattice about 0.1–2.0% by weight of manganese. Such a composition can be represented by the formula $Pt_xMn_zCo_yO_2$, in which $x$ and $y$ have the same meaning as above, and $z$ is comprised within the range about 0.004–0.11. Whether or not containing managanese, this oxide has a crystal structure based on the rhombohedral space group $R\bar{3}m$. It can be prepared by several methods, including a high temperature and pressure reaction of $Co_3O_4$ with $PtO_2$, optionally in the presence of $MnO_2$.

SUMMARY OF THE INVENTION

According to this invention rhombohedral platinum cobalt oxide having the space group $R\bar{3}m$, and optionally containing 0.1–2% by weight of manganese in its crystal lattice, is used as an ingredient of ceramic electrical resistor compositions. These compositions can be made by mixing the finely divided platinum cobalt oxide with a powdered dielectric material, such as finely divided vitreous enamel or glass frit. The composition is applied to a ceramic dielectric substrate and fired thereon to produce an electrical resistor.

DETAILED DESCRIPTION OF THE INVENTION

Mixtures of about 1–3 parts by weight of the rhombohedral platinum cobalt oxide, optionally containing 0.1–2.0% by weight of manganese in its crystal lattice, with one part of a dielectric material such as a vitreous enamel or glass frit have been found to give good results. Such mixtures can, if desired, be further mixed with liquid or paste vehicles, e.g., water, alcohols, esters, liquid resins, and the like, with or without thickener to provide a composition having a consistency suitable for the particular method to be used in applying this composition to ceramic dielectric substrates. The finished resistor can be made by applying the composition to the ceramic dielectric substrate by conventional means, e.g., by spraying, stenciling, screen-printing, or brushing. The ceramic dielectric substrate can be composed of any ceramic material that can withstand firing temperatures of the oxide-powdered dielectric material composition, e.g., glass, porcelain, barium titanate, aluminum oxide, and the like. After the composition is applied in a uniform thickness, e.g., of the order of 15 to 25 microns, the composition is dried, if necessary, to remove solvent from the vehicle and then fired in a conventional lehr or furnace at a temperature at which the frit is molten, whereby the conductive oxide is bonded to the ceramic dielectric.

This invention is illustrated by the following example, which describes the preparation of an electrical resistor composition containing the rhombohedral platinum cobalt oxide and the fabrication of electrical resistors based thereon.

EXAMPLE

Finely divided rhombohedral platinum cobalt oxide was prepared by heating for eight hours a mixture of three molar proportions of $PtO_2$ and one molar proportion of $Co_3O_4$ in a platinum tube at 850° C. and 1000 atmospheres pressure. The product was then ground to pass through a 200-mesh screen. The electrical resistivity of this oxide was $9.4\times10^{-5}$ ohm. cm. at 298° K. and $4.4\times10^{-5}$ ohm. cm. at 4.2° K. This material was mixed with powdered (ball-milled) glass of the following composition: $SiO_2$, 25% by weight; PbO, 65%; and $B_2O_3$, 10%; and a liquid vehicle consisting of 90% $\beta$-terpineol and 10% of low viscosity ethyl cellulose. The proportions of the various ingredients of the composition are tabulated below. The compositions were screen-printed on small aluminum oxide plates, and the coated plates were fired under the conditions given in the table to produce electrical resistors. The resistors were mechanically strong and had acceptable resistance, thermal coefficients of resistance (TCR), and drift. They were outstanding in their stability under a reducing atmosphere.

TABLE.—ELECTRICAL RESISTORS CONTAINING PLATINUM COBALT OXIDE

| Resistor No. | Solids: Oxide | Solids: glass | Solid/liquid ratio | Firing conditions | Resistance (ohms) |
|---|---|---|---|---|---|
| 1 | 75 | 25 | 3:1 | Belt furnace, 8 min. cycle, 770° C. peak | 81.6 |
| 2 | 75 | 25 | 4:1 | Belt furnace, 45 min. cycle, 760° C. peak | 78.4 |
| 3 | 50 | 50 | 3:1 | Belt furnace, 8 min. cycle, 770° C. peak | *12.3K |
| 4 | 50 | 50 | 3:1 | Muffle furnace, 10 min., 760° C | *7.33K |

*K=1,000 ohms.

NOTE: Resistor No. 2 exhibited a hot TCR of 182 p.p.m./° C.

When resistor No. 1 was exposed to a reducing atmosphere (85% $H_2$ and 15% $N_2$ by volume) for four hours at 100° C., the drift in the resistance was 3.8%. When resistor No. 4 was exposed to the same reducing atmosphere under the same conditions, the drift in resistance was only 0.01%. The resistance of an ordinary glaze resistor would have changed by a factor of two or more under such conditions.

The embodiments of the invention in which an exclusive property or privilege is claimed are defined as follows:

1. An electrical resistor composition containing a powdered dielectric material and an electrically conductive metal oxide having a crystal structure based on the rhombohedral space group $R\bar{3}m$, said metal oxide being selected from compounds of the following formulae:

(a) $Pt_xCo_yO_2$ and (b) $Pt_xMn_zCo_yO_2$ wherein each of $x$ and $y$ is independently about $0.85\pm0.15$, and $z$ is a value comprised within the range of about 0.004–0.11.

2. A composition of claim 1, wherein the electrically conductive metal oxide has the formula $Pt_xCo_yO_2$, each of $x$ and $y$ independently being about $0.85\pm0.15$.

3. A composition of claim 1, wherein the electrically conductive metal oxide has the formula $Pt_xMn_zCo_yO_2$, each of $x$ and $y$ independently being about $0.85\pm0.15$ and $z$ being comprised within the range of about 0.004–0.11.

4. A composition of claim 1 wherein the powdered dielectric material is selected from the group vitreous enamel and glass frit.

5. A process for fabricating a ceramic electrical resistor comprising the steps of (a) applying to a ceramic dielectric substrate a composition of claim 1, and (b) firing at a temperature sufficient to melt the powdered dielectric material and to form a bonded coating of the electrically conductive oxide on the ceramic dielectric substrate.

6. An electrically conductive resistor comprising a dielectric ceramic substrate having bonded thereon a coating containing an electrically conductive metal oxide having a crystal structure based on the rhombohedral space group $R\bar{3}m$, said metal oxide being selected from compounds of the following formulae:

(a) $Pt_xCo_yO_2$ and (b) $Pt_xMn_zCo_yO_2$ wherein each of $x$ and $y$ is independently about $0.85\pm0.15$, and $z$ is a value comprised within the range of about 0.004–0.11.

7. An electrically conductive resistor of claim 6, in which the coating is bonded to the dielectric substrate by means of a dielectric material.

8. A resistor of claim 6, wherein the metal oxide has the formula $Pt_xCo_yO_2$, each of $x$ and $y$ independently being about $0.85\pm0.15$.

9. A resistor of claim 6, wherein the metal oxide has the formula $Pt_xMn_zCo_yO_2$, each of $x$ and $y$ independently being about $0.85\pm0.15$, and $z$ being comprised within the range of about 0.004–0.11.

References Cited

UNITED STATES PATENTS 3,514,414 5/1970 Shannon ---------- 252—518

DOUGLAS J. DRUMMOND, Primary Examiner

U.S. Cl. X.R.

117—201